US 8,606,305 B2

(12) United States Patent
Bontempi et al.

(10) Patent No.: US 8,606,305 B2
(45) Date of Patent: Dec. 10, 2013

(54) IMPERSONAL MOBILE COMMUNICATION FOR INTERNET COMMUNITIES

(75) Inventors: Richard Bontempi, Rome (IT); Risto Antero Kauppinen, Helsinki (FI); Guido Triebel, Espoo (FI)

(73) Assignee: Nokia Siemens Networks Oy, Espoo (FI)

( * ) Notice: Subject to any disclaimer, the term of this patent is extended or adjusted under 35 U.S.C. 154(b) by 504 days.

(21) Appl. No.: 12/682,995

(22) PCT Filed: Oct. 20, 2008

(86) PCT No.: PCT/EP2008/008873
§ 371 (c)(1),
(2), (4) Date: Apr. 14, 2010

(87) PCT Pub. No.: WO2009/049915
PCT Pub. Date: Apr. 23, 2009

(65) Prior Publication Data
US 2010/0255825 A1  Oct. 7, 2010

(30) Foreign Application Priority Data
Oct. 18, 2007  (EP) .................................... 07020459

(51) Int. Cl.
*H04Q 7/20* (2006.01)

(52) U.S. Cl.
USPC ........ 455/461; 455/456.4; 455/462; 455/463; 379/202; 379/93.21; 379/900; 379/211

(58) Field of Classification Search
USPC .................... 455/456.4, 556.2, 461
See application file for complete search history.

(56) References Cited

U.S. PATENT DOCUMENTS 6,175,619 B1 * 1/2001 DeSimone ............... 379/202.01

FOREIGN PATENT DOCUMENTS

| EP | 0 984 608 | 3/2000 |
| WO | 00/69140 | 11/2000 |
| WO | 01/50682 | 7/2001 |
| WO | WO 03094475 A1 * | 11/2003 |

* cited by examiner

Primary Examiner — Charles Appiah
Assistant Examiner — Randy Peaches
(74) Attorney, Agent, or Firm — Squire Sanders (US) LLP

(57) ABSTRACT

The present invention relates to a method and server apparatus for providing an impersonal communication service in a telecommunication network, wherein a user is authenticated by a token-based application programming interface functionality and a temporary virtual number is allocated to an impersonal communication session of the user. The allocated temporary virtual number is then used for a telecommunication of the user.

13 Claims, 7 Drawing Sheets impComm.auth
    .getToken(api_key,frob,api_sig) / Returns the auth token for the given frob
    .checkToken(api_key,token,api_sig)/ Returns user's IC Id. associated to the token and token's expiration time
    .refreshToken (api_key,token,api_sig) / Returns new expiration time for the token impComm.comm
    getNumber (api_key, token, caller_id. caller_#. api_sig) / Returns # for voice call establishment
        caller_id = caller's IC_X Id or 'anonymous'
        caller_# = caller's phone MSISDN or '0' (number not available) or '1' (number fetchable from DB)
        Error codes: 10,..

impComm.service
    .suspend (api_key. token, api_sig) / Suspends temporarily the service for user associated to the given token
    .reactivate (api_key, token, api_sig) / Reactivates the service for user associated to the given token
    .retrieveSubs (api_key, api_sig) / Retrieves list of ImpComm subscribers from the calling IC_X (identified by their IC_X Ids)

Fig. 3

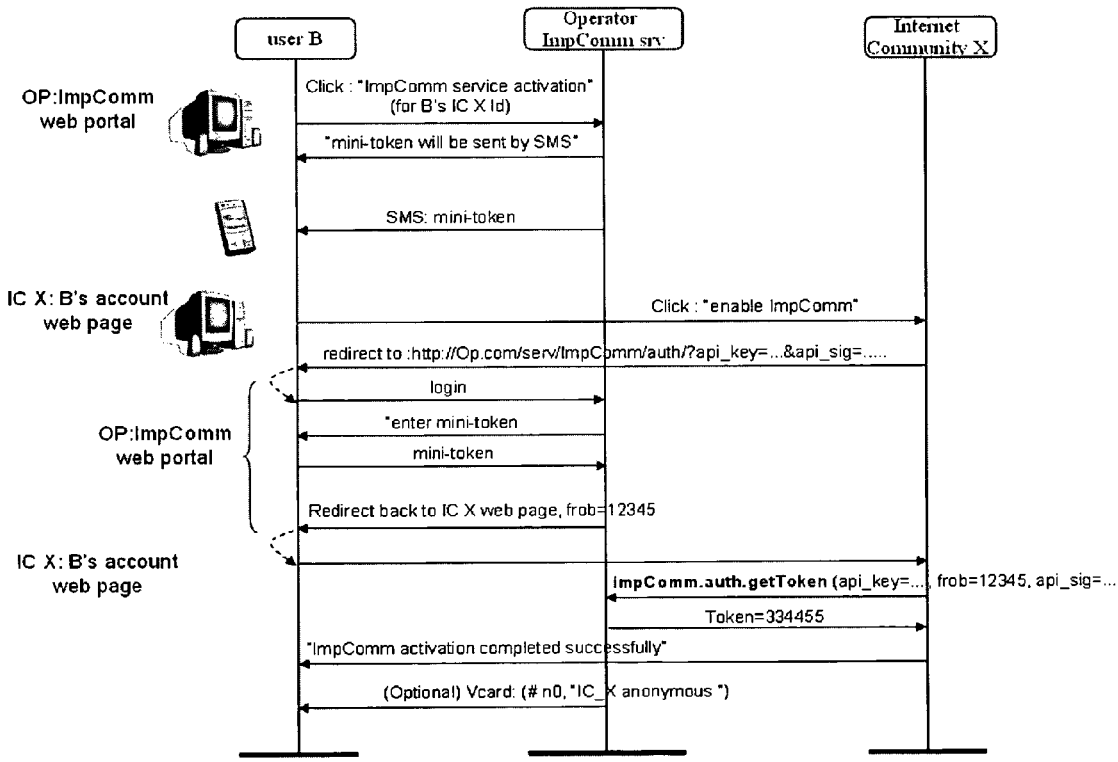

Fig. 4

|  | Caller's MSISDN known by the server | Caller's MSISDN not known by the server |
|---|---|---|
| Manual dialing to call | (1) Temporary number allocated and shown on PC display. Dial number to call | (3) Extension number allocated and shown on PC display. Dial service number and extension number (via DTMF) to call |
| Flash SMS received and press green button to call | (2) Temporary number allocated and received by Flash SMS. Press green button to call | (4) Code number (mapped to callee) allocated and shown on PC display. Dial service number and Code (via DTMF). Temporary number allocated and received by Flash SMS. Press green button to call |

Fig. 5

IMPERSONAL MOBILE COMMUNICATION FOR INTERNET COMMUNITIES

FIELD OF THE INVENTION

The present invention relates to a method and server apparatus for providing an impersonal communication service in a mobile network.

BACKGROUND OF THE INVENTION

The popularity of Internet communities (IC) has given rise to a new type of personal identity. Members of ICs often generate themselves a pseudo-identity that is relevant only within each respective IC and identified by a pseudonym. By contributing to the discussions and communication within the community they earn credibility and respect for their community identity: it becomes an asset However, disclosing one's true identity in the Internet has, unfortunately, proven hazardous because of the inherent nature of Internet communities, i.e. worldwide visibility and usually unrestricted access for viewing the communications.

Before the ICs became such a widely adopted communication culture in the Internet, there has been no need to provide enhanced impersonal communication facilities in the field of telecommunications and the only means for hiding the true identity has been total anonymity either by hiding the calling subscriber's address/number or by hiding the subscriber data related to the calling subscriber's number.

To enable voice calls and SMS messaging between mobile users and Internet communication service clients or web clients, mechanisms have been proposed which use temporary numbers in order to route a communication setup signalling through a server where the circuit switched call setup signalling is converted into voice over IP (VoIP) signalling and forwarded towards the Internet communication service domains. This however requires heavy integration with the Internet communication service's infrastructure.

SUMMARY

It is therefore an object of the present invention to provide a complete and simple solution for impersonal telecommunication for Internet communities.

This object is achieved by a method of providing an impersonal communication service in a telecommunication network, said method comprising:
  authenticating a user by a token-based application programming interface functionality;
  allocating a temporary virtual number to an impersonal communication session of said user; and
  using said allocated temporary virtual number for a telecommunication of said user.

Additionally, the above object is achieved by a server apparatus for providing an impersonal communication service in a telecommunication network, said server apparatus being adapted to authenticate a user by a token-based application programming interface functionality, to allocate a temporary virtual number to an impersonal communication session of said user; and to use said allocated temporary virtual number for a telecommunication of said user.

Further, the above object is achieved by a system comprising at least one server apparatus as defined above.

In addition, the above object is achieved by a computer program product comprising code means for producing the steps of the above methods when run on a computer device.

Accordingly, an impersonal communication service can be supported by the administrators of the Internet community "simply" as an additional web service for their web sites, based on web technology, implemented by an impersonal communication service API. This allows easy integration with minor modifications required in web sites of Internet communities. Moreover, the fixed or mobile operator's service portfolio can be enhanced by a new and desirable service for fixed or mobile subscribers.

Hence, impersonal communication solutions can be used to enable "impersonal" mobile or fixed communication in the scope of Internet communities. That is, people can communicate with their mobile phones or fixed phones as members of a certain Internet community, while only the Internet community's identity is known. This allows them to keep in touch and communicate (via fixed or mobile phone) when they are not online to have a feeling of a "closer" relationship. Additionally, an Internet community member can be contacted anonymously and/or "private" messages (not visible to other users) can be exchanged with an Internet community member, instead of public chatting.

As the impersonal communication solutions can be based on well known web technology (e.g. Web 2.0 technology) and can be used as a common web service API, very minor integration with the Internet community infrastructure is required (for example basically only few modifications to the user interface of the IC service's web pages).

The temporary virtual number may be used to provide a mapping between subscriber identities of call parties of the mobile or fixed communication. In a specific but non-limiting example, the subscriber identities may be MSISDN numbers.

Furthermore, the authenticating may comprise validating a subscriber identity and Internet community identity of the user.

Additionally, a service web portal of a mobile or fixed network operator may be provided for subscribing to the impersonal communication service.

The authenticating may comprise transmitting a token to the user via the mobile or fixed telecommunication network, and using the token to enable the impersonal communication service.

Further, an activating means may be added to a web page of the user, the activating means being adapted to enable impersonal communication with the user. More specifically, the activating means may be a button or link.

The temporary virtual number may be displayed at a display of the user and the temporary virtual number may then be dialed to set up a call.

As an alternative or additional option, the temporary virtual number my be received by a short message.

As another alternative or additional option, the temporary virtual number may be indicated as an extension number at a display of the user and a service number and said extension number may be dialed to set up the call.

As a further alternative or additional option, a code number may be allocated and indicating at a display of the user. A service number and the code number may be dialed, and the temporary virtual number may be received in a short message.

It is further noted that an expiration time for the allocated temporary virtual number may be adjustable from one-time usage to permanent usage.

Further advantageous modifications or developments are defined in the dependent claims.

BRIEF DESCRIPTION OF THE DRAWINGS

The present invention will now be described on the basis of various embodiments with reference to the accompanying drawings in which:

FIG. 3 shows impersonal communication service application programming interface methods according to the embodiments;

FIG. 4 shows an exemplary signaling diagram of an impersonal communication service activation procedure according to a first embodiment;

FIG. 5 shows a table summarizing different use cases and their session setup alternatives;

DESCRIPTION OF THE EMBODIMENT

The embodiments will now be described in connection with a mobile impersonal communication for Internet communities. According to the embodiments, a complete solution for mobile impersonal communication can be provided, which enables impersonal mobile communication for Internet Communities. The proposed complete solution according to the embodiments comprises an API functionality based on API keys and authentication of users, request and allocation of temporary virtual numbers and mobile communication (voice and/or video call, SMS, MMS, etc.) with temporary virtual numbers.

More specifically, the proposed embodiments serve to "mobilize" Internet community users. Thus, an Internet community user can be reached on his/her mobile phone (for voice call, SMS messaging etc.) by anonymous or other Internet community users. It is however noted that the present invention is not intended to be restricted to mobile communication. It can be applied to any telecommunication network including fixed networks.

Figure 1:
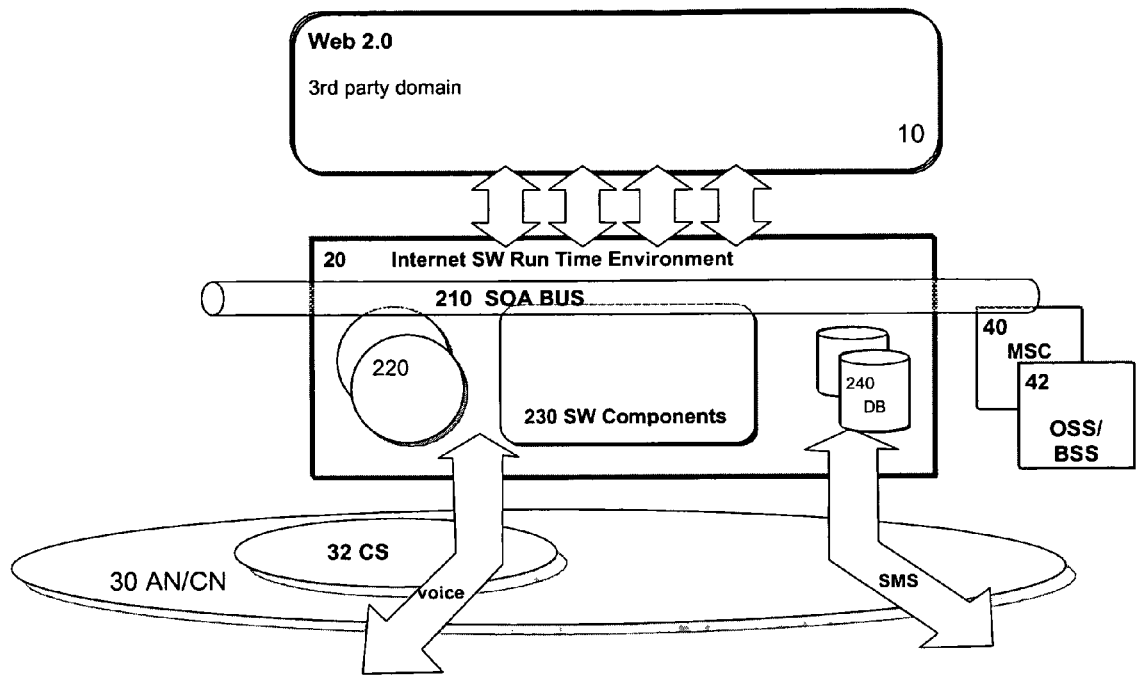
FIG. 1 shows a schematic diagram of a network environment in which the embodiments can be implemented.

FIG. 1 shows a schematic block diagram of a network environment in which the proposed embodiments could be implemented. A third party domain 10 (e.g. a Web 2.0 based domain) provides Internet service applications to an Internet software (SW) run time environment 20 which comprises SW components 230, application logic(s) 220, and database(s) 220, coupled via a bus system 210 of a service oriented architecture (SOA) and which can access the third party domain 10 by using web service interfaces (WSIs). Additionally, the SOA bus system 210 may provide access to OSS/BSS system(s) 42 and/or to mobile switching center(s) 40. Mobile voice-based communication can be achieved via a circuit switched (CS) domain 32 of a mobile core and access network 30. Additionally, SMS-based mobile communication can be provided via the core and access network 30. Hence, web-based APIs and combination of these with mobile services can be implemented e.g. based on SOA or a service delivery platform (SDP) and using WSIs.

Figure 2:
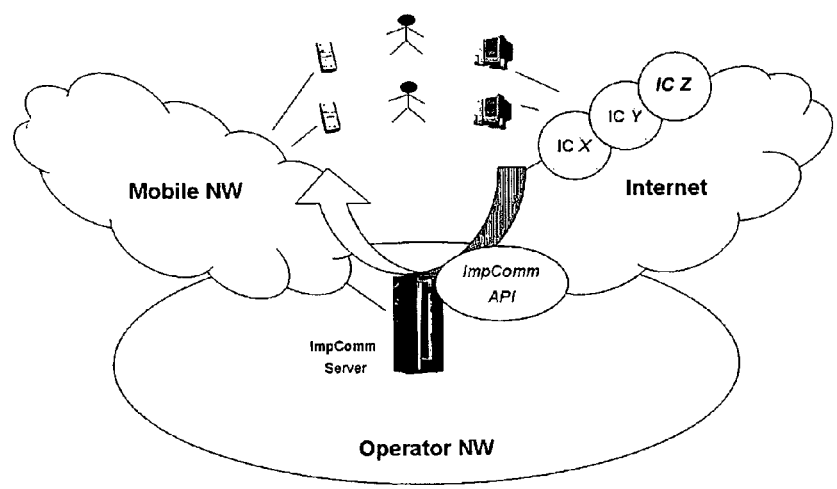
FIG. 2 shows a high level network view of an impersonal communication service according to the embodiments.

FIG. 2 shows a high level network view of an impersonal communication service according to the embodiments, which could be based on the above architecture of FIG. 1. Here, an impersonal communication service (e.g. Impersonal communication service) is provided from an Internet community relationship to mobile communication. In FIG. 1 exemplary Internet communities X, Y, and Z are indicated, which can be accessed by users via terminal devices which provide access to the Internet. On the other hand, users can access the mobile network by mobile terminals or user equipments.

This solution enables "impersonal" mobile communication (voice call, SMS, etc.) by mapping temporary numbers with call parties MSISDN numbers. This mapping is achieved by an impersonal communication server provided in an operator network and accessible by means of an impersonal communication API. Call parties' MSISDN numbers thus do not have to be disclosed. Call parties are identified by their Internet Community identities or optionally the caller can remain anonymous. The proposed impersonal communication service may thus be implemented as a common web based service API (e.g. web 2.0 based service API). Hence, very minor integration with Internet community service is required.

FIG. 3 shows impersonal communication service API methods "impComm.auth", "impComm.comm", and "impComm.service" according to the embodiments. A token based authentication procedure can thus be implemented for service activation of the impersonal communication service. Such a procedure allows to validate the MSISDN and the Internet community identity provided by the user (i.e. the user is the real owner of them). It is noted that service deactivation and user blocking can be operated by service subscribers via operator's impersonal communication service web portal.

FIG. 4 shows an exemplary signaling diagram of an impersonal communication service activation procedure according to a first embodiment.

As possible pre-conditions, the Internet community X supports the impersonal communication service offered by the mobile operator. The Internet community X has got an API key from the mobile operator, it has implemented the API and provides access to the impersonal communication service from the Internet community service web pages. The mobile operator offers the impersonal communication service to mobile subscribers from an impersonal communication service web portal. A user B is a member of the Internet community X and wants to activate the impersonal communication service for his/her IC X identity.

The activation procedure may comprise the following steps. User B accesses the mobile operator's impersonal communication service web portal and subscribes to the service. He/she selects the Internet community X (among the set of Internet Communities supporting the impersonal communication service) and provides his/her IC X identity (e.g. alice@dogs.com). A mini-token (e.g. a short alpha numerical string) is sent by SMS to user B's mobile phone. Then, user B performs a login to the web page of the Internet community X in order to enable the impersonal communication service. User B clicks on an "enable ImpComm" button or link and he/she is re-directed to the mobile operator's web page where he/she is requested to enter the mini-token previously received by SMS. It is noted that this step is needed to verify the mapping and the ownership of the MSISDN and IC X identity provided by the user B.

The user B is now re-directed back to the IC X web page. The IC X service requests (via impersonal communication API method e.g. as shown in FIG. 3) an authentication token to the impersonal communication service. This token can be included every time the IC X service makes a request for a new impersonal communication session for the user B. Basically, the token creates a mapping between the API key assigned to the IC X service, the user B's IC X identity and the user B's MSISDN number. At this phase the impersonal communication service activation is successfully completed.

Once the Impersonal communication service has been activated for the user B's IC X identity, the IC X service may add the "ImpComm" button in the user B's account web page. Henceforth, anyone (e.g. a user A) visiting user B's web page in the IC X web site could click on the "ImpComm" button in order to have an impersonal communication with user B.

FIG. 5 shows a table which indicates four use cases (1) to (4) with different alternative scenarios for the proposed impersonal communication session setup.

The first and second use cases (1) and (2) assume that when the "ImpComm" button is clicked, the user A is requested to enter his/her MSISDN number. Thus, the MSISDN number is known by the impersonal communication server. The difference between the first and second use cases (1) and (2) is that in the first use case (1) the allocated temporary number is shown on user A's PC display and user A manually dials to call. In the second use case (2) user A receives the temporary number by a flash SMS and merely has to press the green button on its mobile phone to call.

In the third use case (3), instead of a temporary number, an extension number is allocated which univocally maps to user B's MSISDN number. The user A has to dial a impersonal communication service number (shown on IC X web page) and enter an extension number (via DTMF) on his/her mobile phone. It is noted that the extension number is allocated by the impersonal communication server after user A clicked the "ImpComm" button in user B's IC X web page. The extension number is reserved for this impersonal communication session with user B and cannot be simultaneously re-used for other Impersonal communication sessions).

In the fourth use case (4), a temporary number is allocated like in the first and second use cases (1) and (2) with the difference that user A is not requested to enter his/her MSISDN number. Instead, the impersonal communication server generates an "extension code" (e.g. a short numerical string) that univocally maps to user B's MSISDN. Such code can be shown on user A's PC display. User A may dial an impersonal communication service number and enter the extension code (via DTMF). This allows the impersonal communication server to map the user A's MSISDN number to user B's MSISDN number and allocate a temporary number (like in the first and second use cases (1) and (2). The temporary number is then sent to user A's mobile phone in form of a Flash SMS.

Figure 6:
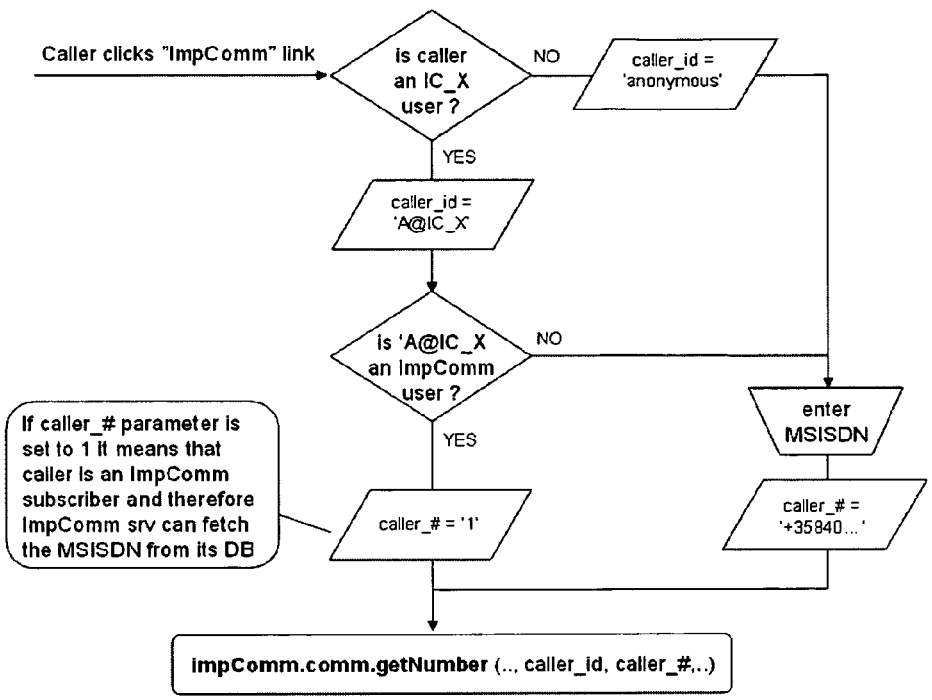
FIG. 6 shows a flow diagram of a procedure according to a second embodiment for determining a caller's MSISDN number for first and second use cases.

FIG. 6 shows a flow diagram of a procedure according to a second embodiment for determining a caller's MSISDN number for the above first and second use cases (1) and (2).

When a caller clicks the "ImpComm" button or link, the procedure checks whether the caller is an IC X user. If not, the caller ID is set to an anonymous state and the caller is requested to enter his/her MSISDN, and a caller number parameter is set to the MSISDN number. If the caller is an IC X user, his/her caller ID is set to indicate this and it is checked whether the caller is a user of the impersonal communication service. If not, the caller is requested to enter his/her MSISDN and the caller number parameter is set to the MSISDN number. If the caller is already a user of the impersonal communication service, the caller number parameter is set to a predefined value or state, e.g. "1", to indicate that the MSISDN can be fetched from a database of the impersonal communication server. Finally, a service API method is started, which gets the number of the caller.

It is noted that the caller's (e.g. user A's) MSISDN is thus provided to the impersonal communication server so that it can allocate a temporary number that is univocally mapped to user A's and user B's MSISDN numbers. The combination of user A's MSISDN number and this temporary number univocally identifies the impersonal communication session that is going to be setup. The same temporary number can be simultaneously re-used for other impersonal communication sessions initiated by other users.

Figure 7:
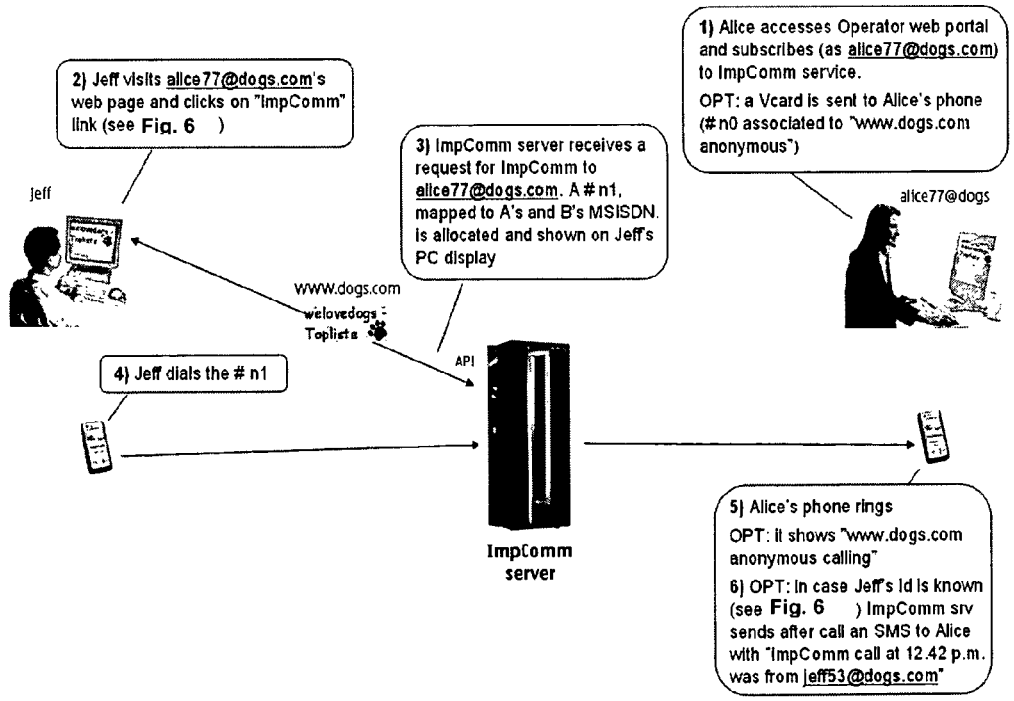
FIG. 7 shows a signaling example of the first use case for impersonal communication voice call setup according to a third embodiment.

FIG. 7 shows a signaling example of the first use case (1) for impersonal communication voice call setup according to a third embodiment.

A detailed description of the five individual signalling steps can be gathered from FIG. 7.

Figure 8:
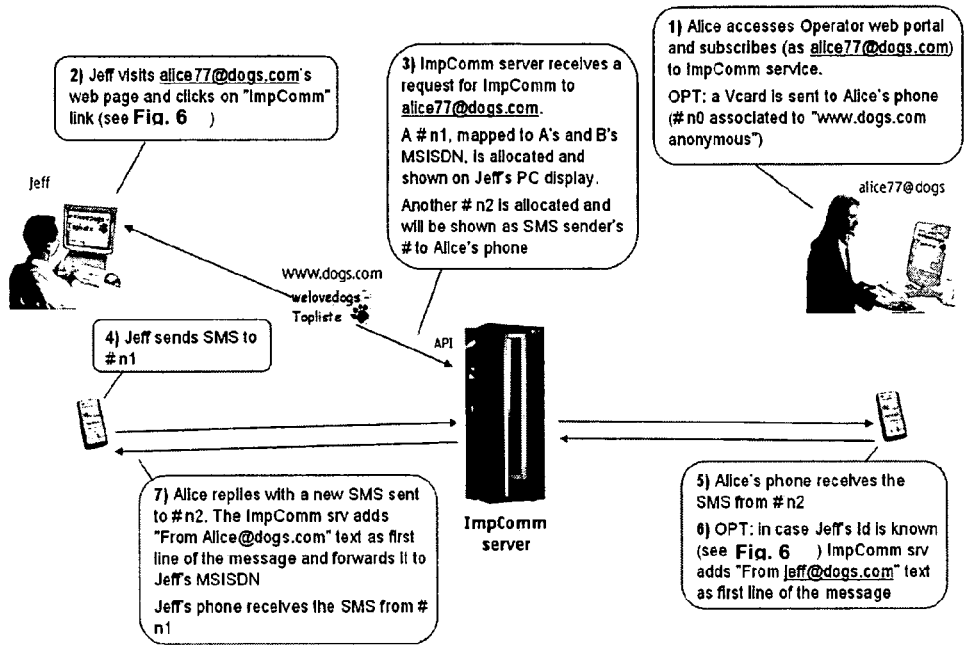
FIG. 8 shows a signaling example of the first use case for impersonal communication SMS messaging setup according to a fourth embodiment.

FIG. 8 shows a signaling example of the first use case (1) for impersonal communication SMS messaging setup according to a fourth embodiment;

A detailed description of the five individual signalling steps can be gathered from FIG. 8.

Figure 9:
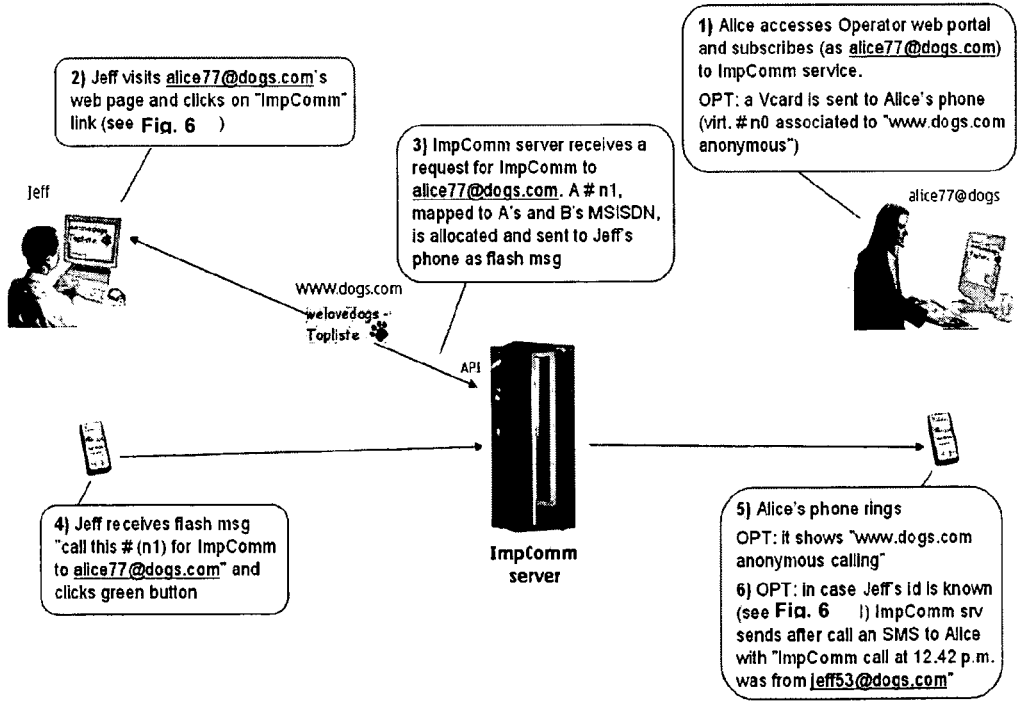
FIG. 9 shows a signaling example of the second use case for impersonal communication voice call setup according to a fifth embodiment.

FIG. 9 shows a signaling example of the second use case (2) for impersonal communication voice call setup according to a fifth embodiment. Here, the allocated temporary number is sent to user A's mobile phone in form of a flash SMS.

A detailed description of the five individual signalling steps can be gathered from FIG. 9.

Figure 10:
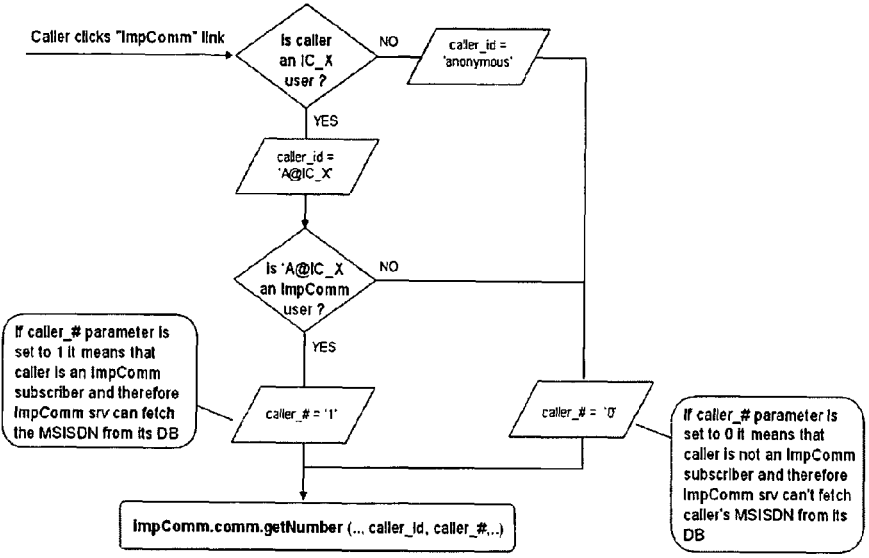
FIG. 10 shows a flow diagram for third and fourth use cases according to a sixth embodiment.

FIG. 10 shows a flow diagram for third and fourth use cases (3) and (4) of FIG. 5 according to a sixth embodiment. As indicated above, the third and fourth use cases (3) and (4) assume that the user A is not requested to enter his/her MSISDN number.

When a caller clicks the "ImpComm" button or link, the procedure checks whether the caller is an IC X user. If not, the caller ID is set to an anonymous state and a caller number parameter is set to a first predefined value or state, e.g. "0" to indicate that the MSISDN cannot be fetched from the database of the impersonal communication server. If the caller is an IC X user, his/her caller ID is set to indicate this and it is checked whether the caller is a user of the impersonal communication service. If not, the caller number parameter is set to the above first predefined number or state. If the caller is already a user of the impersonal communication service, the caller number parameter is set to a second predefined value or state, e.g. "1", to indicate that the MSISDN can be fetched from the database of the impersonal communication server. Finally, a service API method is started, which gets the number of the caller.

Figure 11:
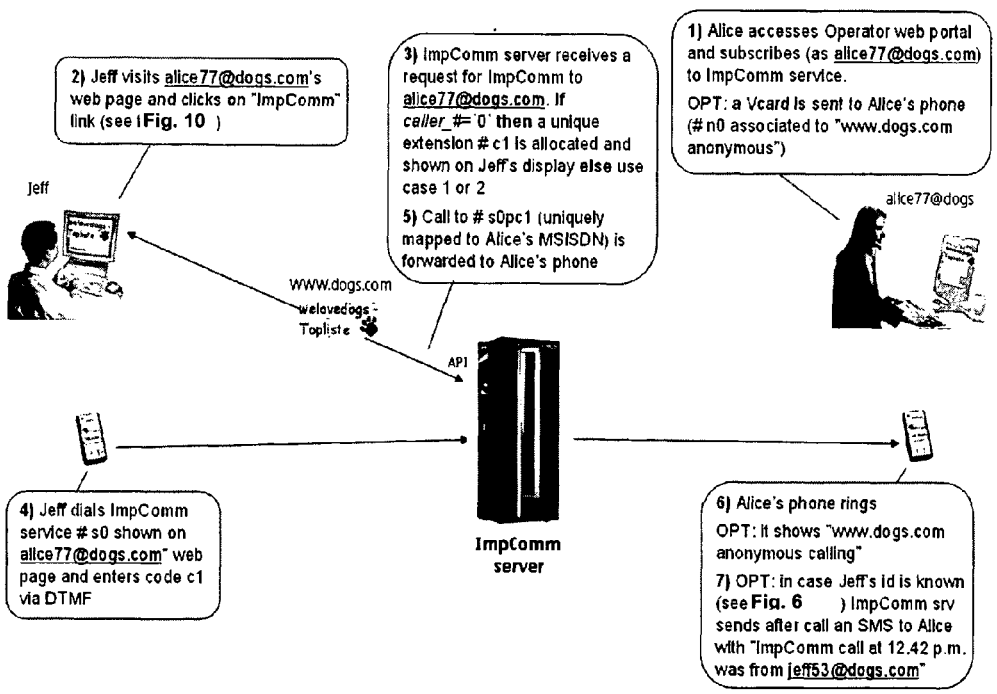
FIG. 11 shows a signaling example for the third use case according to a seventh embodiment for impersonal communication voice call setup.

FIG. 11 shows a signaling example for the third use case (3) according to a seventh embodiment for impersonal communication voice call setup.

A detailed description of the six individual signalling steps can be gathered from FIG. 11.

Figure 12:
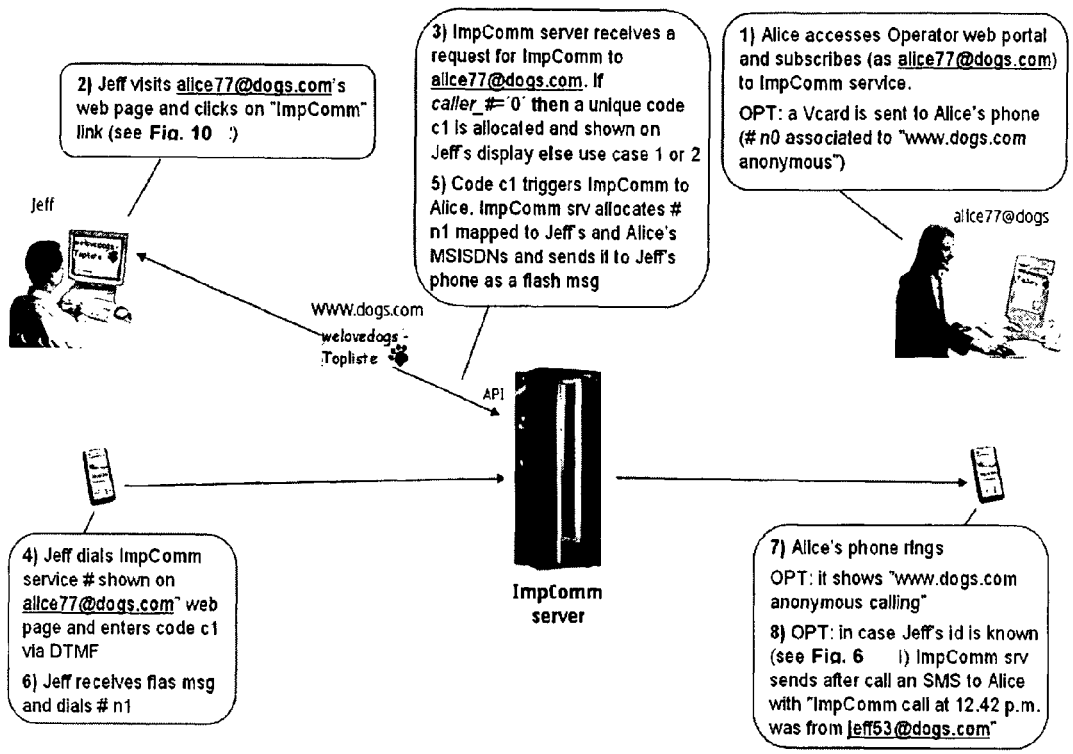
FIG. 12 shows a signaling example for the fourth use case according to an eighth embodiment for impersonal communication voice call setup.

FIG. 12 shows a signaling example for the fourth use case (4) according to an eighth embodiment for impersonal communication voice call A detailed description of the seven individual signalling steps can be gathered from FIG. 12.

All the above first to fourth use cases (1) to (4) provide different user experience using the proposed impersonal communication service.

Figure 13:
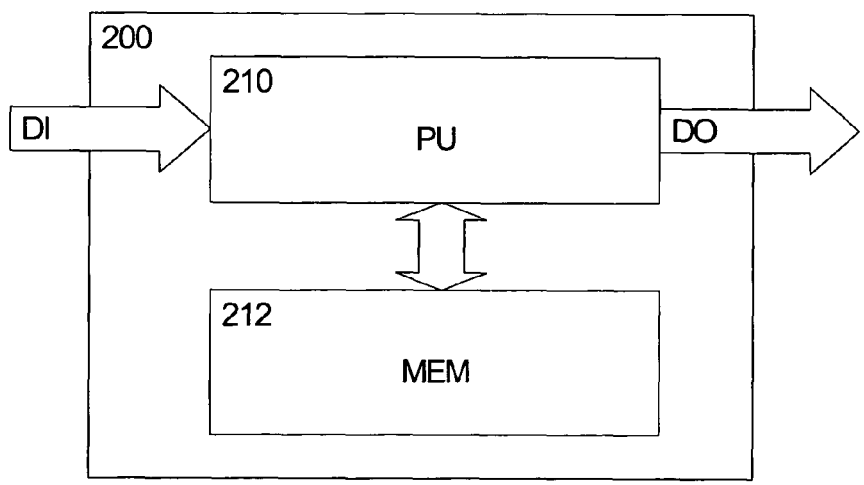
FIG. 13 shows a schematic block diagram of a software-based implementation according to a ninth embodiment.

FIG. 13 shows a schematic block diagram of a software-based implementation of the proposed mobile impersonal communication mechanism. Here, the proposed impersonal communication server comprises a processing unit 210, which may be any processor or computer device with a control unit which performs control based on software routines of a control program stored in a memory 212. Program code instructions are fetched from the memory 212 and are loaded to the control unit of the processing unit 210 in order to perform the processing steps of the above functionalities described in connection with the respective FIGS. 3 to 12. These processing steps may be performed on the basis of input data DI and may generate output data DO, wherein the input data DI may correspond to the MSISDN number or an activation of the "ImpComm" button and the output data DO may correspond to the temporary number which univocally identifies the impersonal communication session.

Hence, according to the above embodiments, any Internet community that wants to enrich its own web services by supporting an impersonal communication service may register its own service application on a mobile or fixed network operator's web portal in order to get an API key. Such an API key may be a parameter required in API-based calls. The Internet community can then implement the impersonal communication API by a few user interface (UI) modifications in the Internet community's web pages (with few additional buttons, links, pop-up windows or the like) in order to facilitate access to the implemented impersonal communication service.

In order to activate an impersonal communication service, a user of the Internet community can subscribe to the network operator's impersonal communication service and may provide its MSISDN number and his/her Internet community identity (ID), e.g., "alice@dogs.com", assuming that the respective Internet community (e.g. "www.dogs.com") supports the impersonal communication service by implementing the API of the impersonal communication service.

A user may even activate an impersonal communication service with more than one Internet community (which support the impersonal communication service) where he/she belongs too.

When an impersonal communication service has been activated for a certain user, within a certain Internet community web site, anyone visiting the IC user's web page could request (for example, by a click on an allocated button (e.g. "Impersonal communication" or the like) or by activating an allocated link) to establish a temporary impersonal communication session (voice call, short message service (SMS) messaging etc.) with that IC user. The click on the allocated button or link or the like in the IC user's web page can be used to trigger the Internet community service to call the impersonal communication API method that forwards the request to an impersonal communication server which may be located in the operator's network.

Temporary numbers are used to route the call setup or SMS messaging through the impersonal communication server responsible for mapping the temporary numbers to call parties' MSISDN numbers (which are not disclosed). Basically, a caller calls (or sends an SMS) to a temporary number allocated by the impersonal communication server. A call request (or SMS) reaches the impersonal communication server which forwards it to the callee's MSISDN number replacing the caller's MSISDN with another temporary number (which is then shown on callee's phone display). The impersonal communication server can be adapted to allocate a temporary number (later provided to the caller) that shall be used (instead of the real MSISDN that cannot be disclosed) in order to call or send an SMS to the IC user's terminal device or user equipment (e.g. mobile phone). Moreover, the impersonal communication server may be adapted to resolve a mapping between temporary numbers and call parties' MSISDN numbers and to route the mobile communication setup signaling between call parties' mobile phones.

In case a caller is a member of the same Internet community and logged in to the IC service when a request for impersonal communication is made, the impersonal communication server obtains information about the caller's IC identity (e.g. "jeff@dogs.com") which can then be provided to the callee (e.g. by SMS).

To summarize, a method and server apparatus for providing an impersonal communication service in a telecommunication network have been described, wherein a user is authenticated by a token-based application programming interface functionality and a temporary virtual number is allocated to an impersonal communication session of the user. The allocated temporary virtual number is then used for a telecommunication of the user.

It is to be noted that the present invention is not restricted to the specific embodiment described above, but can be implemented in any network environment and impersonal communication functionality. The embodiments may thus vary within the scope of the attached claims.

The invention claimed is:

1. A method of providing an impersonal communication service in a telecommunication network, said method comprising:
   authenticating a user by a token-based application programming interface functionality;
   allocating a temporary virtual number to an impersonal communication session of said user;
   using said allocated temporary virtual number for a telecommunication of said user; and
   indicating said temporary virtual number at a display of said user and dialing said temporary virtual number to set up a call.

2. The method according to claim 1, wherein said temporary virtual number is used to provide a mapping between subscriber identities of call parties of said telecommunication.

3. The method according to claim 2, wherein said subscriber identities are Mobile Subscriber ISDN numbers.

4. The method according to claim 1, wherein said authenticating comprises validating a subscriber identity and Internet community identity of said user.

5. The method according to claim 1, further comprising providing a service web portal of a network operator for subscribing to said impersonal communication service.

6. The method according to claim 1, wherein said authenticating comprises transmitting a token to said user via said telecommunication network, and using said token to enable said impersonal communication service.

7. The method according to claim 1, further comprising adding an activating means to a web page of said user, said activating means enabling impersonal communication with said user.

8. A non-transitory computer program product comprising code means for executing the steps of method claim 1 when run on a computer device.

9. A method of providing an impersonal communication service in a telecommunication network, said method comprising:
   authenticating a user by a token-based application programming interface functionality;

allocating a temporary virtual number to an impersonal communication session of said user;

using said allocated temporary virtual number for a telecommunication of said user; and indicating said temporary virtual number as an extension number at a display of said user and dialing a service number and said extension number to set up a call.

10. A method of providing an impersonal communication service in a telecommunication network, said method comprising:

authenticating a user by a token-based application programming interface functionality;

allocating a temporary virtual number to an impersonal communication session of said user;

using said allocated temporary virtual number for a telecommunication of said user; and allocating a code number, indicating said code number at a display of said user, dialing a service number and said code number, and receiving said temporary virtual number in a short message.

11. A method of providing an impersonal communication service in a telecommunication network, said method comprising:

authenticating a user by a token-based application programming interface functionality;

allocating a temporary virtual number to an impersonal communication session of said user; and using said allocated temporary virtual number for a telecommunication of said user;

indicating said allocated temporary virtual number at a display of said user, wherein an expiration time for the allocated temporary virtual number is adjustable from one-time usage to permanent usage.

12. A server apparatus for providing an impersonal communication service in a telecommunication network, said server apparatus comprising:

a processor; and memory including computer program code, the at least one memory and the computer program code configured, with the at least one processor, to cause the server apparatus at least to authenticate a user by a token-based application programming interface functionality;

allocate a temporary virtual number to an impersonal communication session of said user;

use said allocated temporary virtual number for a telecommunication of said user; and indicate said temporary virtual number as an extension number at a display of said user.

13. A system for providing impersonal communication in a telecommunication network, said system comprising at least one server apparatus according to claim 12.

* * * * *